United States Patent
Masiero et al.

(10) Patent No.: US 11,726,352 B2
(45) Date of Patent: Aug. 15, 2023

(54) SPACER DEVICE FOR FRAMES OF SPECTACLES

(71) Applicant: SAFILO SOCIETÀ AZIONARIA FABBRICA ITALIANA LAVORAZIONE OCCHIALI S.P.A., Padua (IT)

(72) Inventors: Paolo Masiero, Padua (IT); Matteo Morosin, Padua (IT)

(73) Assignee: SAFILO SOCIETÀ AZIONARIA FABBRICA ITALIANA LAVORAZIONE OCCHIALI S.P.A., Padua (IT)

( * ) Notice: Subject to any disclaimer, the term of this patent is extended or adjusted under 35 U.S.C. 154(b) by 430 days.

(21) Appl. No.: 16/965,389

(22) PCT Filed: Jan. 15, 2019

(86) PCT No.: PCT/IB2019/050313
§ 371 (c)(1),
(2) Date: Jul. 28, 2020

(87) PCT Pub. No.: WO2019/145824
PCT Pub. Date: Aug. 1, 2019

(65) Prior Publication Data
US 2021/0157173 A1    May 27, 2021

(30) Foreign Application Priority Data
Jan. 29, 2018 (IT) .................. 202018000001680

(51) Int. Cl.
*G02C 11/00* (2006.01)
*G02C 13/00* (2006.01)

(52) U.S. Cl.
CPC .............. *G02C 11/00* (2013.01); *G02C 13/00* (2013.01)

(58) Field of Classification Search
CPC ........ A45C 11/04; G02C 13/00; G02C 11/00; A45F 2200/0541; Y10S 248/902;
(Continued)

(56) References Cited

U.S. PATENT DOCUMENTS 2,720,305 A  * 10/1955 Foster .................... A45C 11/04
                                                              D3/265
3,895,718 A  *  7/1975 Seiller .................... A47F 7/021
(Continued)

FOREIGN PATENT DOCUMENTS

EP      0282460 A2 *  9/1988  ............. A45C 11/04
EP      0282460 A2     9/1988
(Continued)

*Primary Examiner* — Collin X Beatty
(74) *Attorney, Agent, or Firm* — Volpe Koenig

(57) ABSTRACT

A spacer device for spectacles maintains the pair of arms of the frame spaced apart from each other with respect to the front of the frame when they are folded in a closing manner. The device includes a spacer member having a thickness defined between a pair of opposing surfaces, the member extending in a main direction, between a pair of opposing faces, which contact with the front mount of the frame and the arm of the pair of arms which is folded last onto the mount, respectively. A channel extends transversely to the main direction and is provided in a position between the faces, the channel delimited by a pair of walls which face each other in a mutually spaced apart relationship and are connected at an end thereof to a base surface of the channel.

8 Claims, 2 Drawing Sheets

(58) Field of Classification Search
CPC .... Y10T 24/1371; Y10T 24/344; A47F 7/021;
B60R 7/082
USPC ............... 351/111; 206/5; 248/902; 211/85.1
See application file for complete search history.

(56) References Cited

U.S. PATENT DOCUMENTS

| | | | |
|---|---|---|---|
| 4,290,522 A | 9/1981 | Takasaki | |
| 5,408,728 A * | 4/1995 | Wisniewski | ............... A45F 5/02 |
| 5,592,244 A * | 1/1997 | Vyhmeister | ............. B60R 7/082 |
| | | | 351/158 |
| 6,564,432 B1 * | 5/2003 | Kushner | ................ A44B 99/00 |
| | | | 24/523 |
| 2004/0239873 A1 | 12/2004 | Dietz | |
| 2008/0164391 A1 * | 7/2008 | Kushner | ............... A47F 5/0006 |
| | | | 248/227.2 |

FOREIGN PATENT DOCUMENTS

| | | | | |
|---|---|---|---|---|
| WO | WO-9211790 A1 * | 7/1992 | ............. | A47F 7/021 |
| WO | 2005050288 A1 | 6/2005 | | |

\* cited by examiner

SPACER DEVICE FOR FRAMES OF SPECTACLES

TECHNICAL FIELD

The present invention relates to a spacer device for frames of spectacles having the features set out in the preamble of the main claim 1.

TECHNOLOGICAL BACKGROUND

The invention is particularly intended to be used on frames of spectacles in the steps which follow the actual production itself, which steps involve packing for the subsequent transport and storage of the frames up to the final point of sale.

The spacer device according to the invention is further suitable for being used particularly, though non-exclusively, in the frames for spectacles of cellulose acetate.

Frames produced from cellulose acetate are typically characterized by a frequently occurring defect referred to as "unbalancing of the arms".

This defect may be observed with high frequency in frames which are provided with front mounts which are produced from cellulose acetate, independently of the type of material which is used for the production of the rods, whether it be acetate or another plastics material or metal, or another material.

In detail, this defect involves a deformation of the spectacles, that is to say, a deviation with respect to the form provided for the frame.

In this deviation, the two arms have two different orientations in space, respectively, instead of having respective positions which are completely symmetrical and specular with respect to the vertical centre plane of the frame. More specifically, in this typical defect it is evident that one of the two arms has the terminal end (also called "tip") higher with respect to the corresponding end of the second arm.

The defect can readily be examined if the frame is placed with the arms open, that is to say, in a configuration for being worn, on a horizontal plane. In this condition, it may be noted how the tip of one of the two arms is at a given height, or vertical distance, with respect to the support plane (incorrect position), while the tip of the second arm is in contact with the plan itself (correct position).

With the frame and arms open and placed on a horizontal plane, the extent of the defect can therefore also be quantified, assuming as a measurement of the deviation the value of the distance of the lower end of the tip of the arm with respect to the support plane.

So that the frame can be considered to be free from the defect of "unbalancing of the arms", in the sector being referred to the value of this measurement must ideally be zero, and in any case within a "tolerance" limit of generally a few mm (for example, 3 mm).

If the defect of the frame is sufficiently pronounced, that is to say, when the value of the above-mentioned measurement is greater than the tolerated limit, there are negative consequences which are quite significant.

In fact, the lack of symmetry of the frame which characterizes the defect can readily be reflected in incorrect wearing of the spectacles, with a consequent lack of comfort, if not real and proper inconvenience, for the user of the spectacles.

In addition, if the defect is markedly visible, in the case of display of the spectacles at the point of sale there may be a high probability that the potential buyer may have an impression of lack of care in the production of the spectacles, or poor quality of the materials used for the production thereof, with an obvious disadvantage for the manufacturer or the vendor of the frame. The reason for this defect involves the combination of some specific factors which are constituted by the intrinsic features of the material cellulose acetate and by the methods for packing the frame which are adopted for the subsequent conveyance to the point of sale.

At the end of the production process, in fact, the frame leaves the final processing step in a completely symmetrical state, with the arms characterized by positions and orientations which are identical and specular with respect to each other.

The problem starts when the frame is closed, that is to say, the arms are completely folded, for the first time, in the factory, and it is then inserted in protection means and then support means or containment means, which are suitable for the transport of the finished frame to a storage warehouse, from which it is then transported to a potential other store, and then again to a point of sale.

As regards the protection means, this virtually always involves a case or bag of thin plastics material (packaging step). If provided, the frame in its case can then be inserted in a potential holder of a rigid or soft material.

As for the support or containment means, especially for the transfer inside the same factory or possibly for the transfer from factory to factory or from the factory to other sorting stores, there are generally used trays or boxes of lightweight materials (for example, cardboard; expanded polystyrene; plastics material) which are capable of containing or supporting a given number of pieces. Often, these supports or containers have shaped seats in the form of indentations which are provided to receive respective single frames so that each pair of spectacles remains stably retained on the support. As an alternative to indentations, the seats provided in the above-mentioned supports can be obtained by means of simple spaces which are delimited from each other by means of vertical or inclined dividing walls in such a manner that each frame is supported on the support and is interposed between two walls. During the closure of the arms which precedes insertion into the case or bag, the first folded arm (generally the left arm, which is understood to be the arm near the left side of the head of the hypothetical user) is located in direct contact with the front frame. The point or region of contact between the arm and front frame usually involves the end portion of the arm, that is to say, the so-called "tip", and falls at a point or region of the rear surface of the front frame, at the side with respect to the lens retained by the mount itself. Since the arm which is folded first is necessarily interposed between the front mount and the second folded arm, the first arm retains the second one at a given distance from the mount, preventing contact thereof with the mount itself. In other words, in this configuration the second arm (the one folded last) cannot take up the same position as the first arm and therefore the frame has a first asymmetrical configuration. By re-opening the frame, the two arms again take up (at least initially) their own respective positions at the two sides of the frame, theoretically being symmetrical and with specular orientations relative to each other.

When the frame, in a folded configuration, is inserted in a case, bag or similar packaging means, there can be brought about some asymmetrical loads on the spectacles, which produce non-uniform tensions at specific portions of the frame.

These loads become evident particularly when the case (or bag) is characterized by volumes or dimensions which are scarcely sufficient to contain the spectacles, and therefore tend to compress the frame at the inner side, urging the two arms towards the front frame, and vice versa.

In this situation, the arm furthest away from the front seldom comes into contact with the front itself, it being prevented by the arm which rests on the front. However, as a result of the pressure applied by the case or bag, the arm tends in turn to transfer a constant thrust to the arm below, which is already resting on the front.

The "X"-like configuration with which the two arms intersect at the rear of the frame causes, in a manner produced by an external force directed towards compressing them against the front, the outermost arm to urge the arm underneath not only towards the front, but also upwards, that is to say, towards the upper profile of the mount.

The arm resting on the front, however, tends to transfer this loading to the region of the front mount at which it is articulated (generally by means of a screw type hinge), which region is in a position opposite the tip of the same arm.

As a result of the tension transferred into the material of the front in the region of the articulation zone of the arm, in a short time there may be introduced a plastic deformation, that is to say, one which is tendentially irreversible, with respect to loading of the front itself. Typically, the deformation corresponds to a type of torsion or rotation of the region of the front involved in the loading.

This deformation by torsion or rotation is precisely determined by the urging to which the arm is subjected upwards, and also when the compression is released, for example, by removing the frame from the case, it tends to continue to remain.

By releasing the compression force, the deformed region of the front thereby remains orientated so as to have the arm with the tip raised.

The beginning of the local plastic deformation in the front mount can be explained with the so-called phenomenon of visco-elastic sliding (also indicated in the technical field by the terms "creep" or "cold flow"), which occurs in the plastics material.

The "creep" is a phenomenon which may occur, for example, in polymer materials, if they are subjected to a continuous force or force having an intensity which is sufficiently high. In practice, as a result of the external loading (for example, traction, flexion, compression) at a molecular level there may take place a slow relative sliding of the macro-molecules which constitute the polymer material.

By moving the macro-molecules or "polymer chains" of the material, the product subjected to the loading becomes deformed in a visible or measurable manner to a greater or lesser extent in accordance with the intensity or the duration of the effort. The movement of the macro-molecules is tendentially non-reversible and consequently the deformation of the product is of the "plastic" type, that is to say, it is tendentially permanent.

So far, reference has been made to the case of packaging cases or bags as an example of an external cause bringing about the defect of the arms being unbalanced. The trays or the boxes or similar containers for transporting or packaging used in the sector can also in any case bring about similar loads on the frames, causing the same phenomenon of "creep" and therefore the same defect.

For questions of containment of costs in the production and transport stages, it is in fact necessary to use, for example, trays which are each provided with a given number of seats or compartments which are each intended to contain a single folded frame. In order to transport at the same time the greatest possible number of pieces for the same dimensions of the tray used, and therefore to reduce costs, there is a tendency to form seats or compartments having dimensions which have been minimized so as to increase the number thereof. These compartments with reduced dimensions may be so reduced as to barely contain the frames and therefore to compress them at the inner side thereof (for example, inside the lowered seats which are formed in the container, or in the space which is present between two dividing walls) in a similar manner to what occurs with the cases.

Since the extent of the phenomenon of "creep" depends on the time of application of the loading, the greater the time spent by the frame being compressed inside the container, the greater is the extent of the variation of shape, that is to say, of the defect.

In addition, the extent of the deformations as a result of the "creep" also depend on the temperature. The greater the temperature of the environment in which the product is located, the higher is the sliding rate inside the material, and therefore the greater is the variation of shape, for the same time period. Consequently, all the conditions or situations which involve the display of the frame which is packaged and packed at high temperatures for a given period of time tend to promote the beginnings of the defect of the "unbalancing of the arms". For example, the storage and/or transport of the frame in locations characterized by ambient temperatures which are particularly high can bring about an increase of the incidence and the extent of the same defect.

Naturally, for the same type of packaging or packing used, and for the same time spent by the frame therein, and for the same ambient temperatures to which it has been subjected once packed and packaged, it should not be anticipated that all the frames will have the same extents of deformation. The degree of torsion or in any case deviation of the front is also in fact influenced in various manners by the shape and the thicknesses of the frame.

Although the phenomenon of "creep" or cold sliding generally characterizes all the polymer materials particularly of the thermoplastic type, it is known how cellulose acetate is particularly subject to this behaviour, to a more relevant extent with respect to other thermoplastic materials.

On the other hand, cellulose acetate being one of the materials which is absolutely most required and appreciated for the production of spectacle frames, by virtue of a series of advantageous qualities and features which distinguish it, it is evident how the defect of "unbalancing of the arms" constitutes a problem worthy of attention in the field.

A necessary condition for preventing the defect of "unbalanced arms" is definitively finding a way of preventing the arm folded last from carrying out the pushing loading on the arm which is folded first, that is to say, the loading which is responsible for the permanent deformation located at one side of the front, as soon as the pair of spectacles is packaged, stored or transported in a case or bag or holder (or other container or box or shaped tray) having internal dimensions or volumes which are minimized.

To this end, it may be set out that a solution which is apparently more logical and commonplace could be constituted simply by using cases or bags or trays or boxes or containers, etc., which are simply characterized by dimensions, shapes and volumes which are sufficiently great not to constrain the frames therein in a compressed condition, and therefore with tensioning of the material of the fronts. However, this solution is not applicable in practice.

In fact, in order to be able to compete on the market and therefore to be able to minimize the individual production and transport costs, each manufacturer of the sector cannot do without using packing and packaging means which are provided with minimized dimensions; this is because small means involve lower costs for the production thereof, and also because they are suitable for being transported and stored in greater numbers, for the same available space. In order to at least partially solve the problems set out above, in order to reduce the incidence of the defect of "unbalanced arms", it is known in the field in question to use a type of "spacer" element.

At the end of the production of the frame and before it is packaged or packed, this spacer is positioned between the central bridge of the front mount and the arm which is closed first. In this manner, the spacer prevents the relative movement between the first arm and the front mount, maintaining them moved away by a predefined distance, preventing any transfer of the potential loading by the arm on the front itself and thereby preventing the phenomenon of "creep" in the material of the front.

This spacer has an incision which is cut from a side of the spacer which extends as far as a predefined distance from the opposite side. This incision produces a slot which is intended to receive the first arm so that the arm itself acts in turn as a stop for the spacer itself. Being blocked by the arm, the spacer tends to remain in position even in the event of possible accidental movements of the bag or packaging containing the frame and thereby continues to perform its own function.

This spacer is generally constructed from soft and flexible material and is distinguished by a particularly low weight. It is generally obtained from a plate of expanded material, from which the trimming of the shaping of the spacer is carried out and the subsequent cutting in order to obtain the slot which has to act as a seat for the arm.

Although the spacer of the known type involves low production costs, given the low cost of the basic materials, and the small number and low complexity of the processing operations provided for, it has some limitations which are set out below.

In the first place, the slot does not ensure secure and stable retention of the arm. A simple cut is involved and therefore a simple discontinuity in the material of the spacer, the slot is not capable of adapting to the different shapes and dimensions of the sections of the arms to be received. In order to be able to receive the arm therein, the slot has to "expand", that is to say, it is necessary for the two legs to move apart from each other until there is produced the space which is sufficient to contain the thickness of the arm. Nevertheless, it being possible to produce only a "V"-shaped opening, it is not possible to fit the spacer on the arms with greater thicknesses or dimensions, and to receive them as far as the bottom of the slot (in the region of the vertex of the V) so that they remain blocked in a stable manner there.

Therefore, it is possible that, during the operations for preparing the packaging in the factory, before the frame is inserted in the bag or packaging, the spacer may become detached from the arm, it not being blocked on the frame in any manner. The frequent recurrence of detachments from the frame and subsequent repositionings by the skilled operators involves losses of time, and therefore a resultant increase in the production costs.

In the second place, the spacer of the known type may be readily subjected to breakage along the slot for receiving the arm, especially if it is re-used several times.

The material used, having to be at the same time economically inexpensive and preferably with a low specific weight, necessarily has to have mechanical characteristics which are not high. The slot formed during the plate trimming constitutes, for all purposes, a controlled breakage of the material, because it is obtained by means of the cutting operation. This breakage could readily begin to spread in the adjoining zone of the material, especially if the two legs of the cut were to be subjected to frequent expansions as a result of repeated operations for insertion and removal, also reaching the point of making the spacer unsuitable for use.

Furthermore, a spacer of such a formation has limited aesthetic qualities and/or limited perception of the quality. The simplicity of the shape, and even more so the slot for the arm which is obviously obtained by simply cutting, confer an appearance of the spacer which is rather unrefined and which may be considered to be obtained with little care during processing.

This is incompatible, from a commercial point of view, with the potential use in the packing of pairs of spectacles of high quality, that is to say, products which, as a result of the high value of the construction or decorative materials, and/or as a result of the high consideration and valuation of the market thereof, and/or as a result of other factors, risk being diminished and therefore of seeing the appeal thereof reduced for the possible client, if combined with a spacer of the economical type.

STATEMENT OF INVENTION

A main object of the invention is to provide a spacer device for frames of spectacles which is structurally and functionally configured to overcome the limitations set out with reference to the cited prior art.

This object and other objects which will be set out below are achieved by the invention by means of a spacer device which is constructed according to the appended claims.

BRIEF DESCRIPTION OF THE DRAWINGS

The features and advantages of the invention will be better appreciated from the following detailed description of a preferred embodiment thereof which is illustrated by way of non-limiting example with reference to the appended drawings, in which.

PREFERRED EMBODIMENTS OF THE INVENTION

With reference to the cited Figures, there is generally designated 1 a spacer device for frames for spectacles which is constructed according to the present invention.

Figure 4:
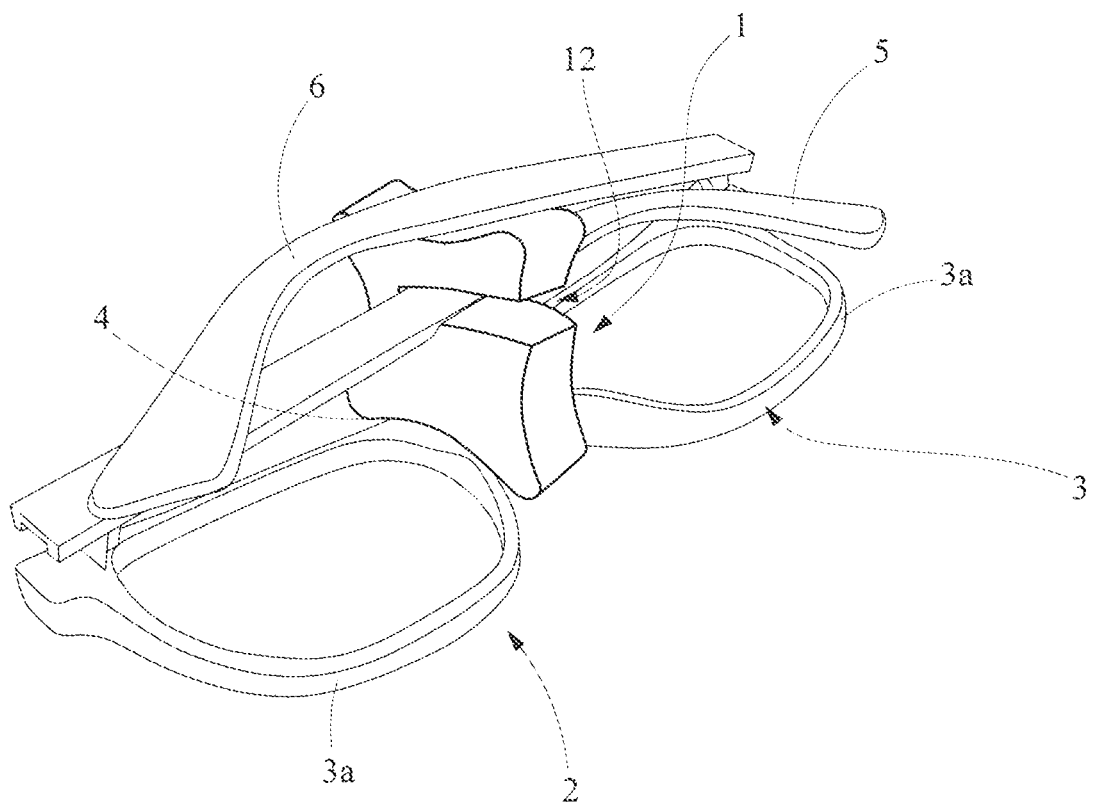
FIG. 4 is a perspective view of the device of the preceding Figures shown in an operating condition of application to a frame for spectacles.

In FIG. 4, the device 1 is illustrated in an operating condition for application to a generic frame 2 for spectacles of the type which is conventional per se and which comprises a front mount 3 which carries lens-carrying rims 3a which are connected to a central bridge 4 and a pair of arms 5, 6 which are articulated to the front mount.

The spacer device 1 is configured to maintain the pair of arms 5, 6 of the frame 2 spaced apart from each other and with respect to the front mount 3 when they are folded onto the mount itself in a closing manner, as illustrated in FIG. 4.

The device 1 comprises a spacer member 7 having a plate-like configuration, the thickness S of which is defined between a pair of opposing surfaces 8, 9. The member 7 extends in a main direction which is designated X, between a pair of opposing faces 10, 11, the face 10 being intended for contact with the front mount 3, the face 11 being intended for contact with the arm 6 which is folded last onto the mount (as shown in FIG. 4).

In accordance with a main feature of the invention, the spacer member 7 comprises a channel 12 which extends in the member transversely to the direction X and which extends through the thickness S and which is provided in a position between the faces 10, 11. The channel 12 is delimited by a pair of walls 13, 14 which face each other in a mutually spaced apart relationship and which are connected at an end thereof to a base surface 15 of the channel.

As shown in FIG. 4, the channel 12 is intended to be engaged by the arm 5 of the pair of arms which is folded first onto the mount 3 so as to remain spaced apart both from the mount 3 and from the other arm 6 adjacent thereto. More specifically, the walls 13, 14 extend in the channel substantially parallel with each other and the channel extends in the member of the spacer transversely, and perpendicularly in a preferred manner, relative to the direction X. In the transverse direction, the channel 12 extends over a main portion of the dimension of the member measured in the same direction.

In a preferred form, the walls 13, 14 of the channel are connected to the base surface 15 with a curved surface profile which is obtained with preselected radii of curvature in the corresponding connection zones.

The dimension of the opening of the channel, that is to say, the distance between the walls 13, 14, is selected to be a value sufficient to receive the arm, this dimension preferably being between 2 mm and 7 mm, and more preferably selected to be approximately 5 mm.

The thickness S of the member 7 is also selected to have a dimension sufficient to ensure stable positioning of the spacer in the region of the central bridge 4 of the frame, in the space between the nose support lugs or plates.

The dimension of the thickness is advantageously between 5 mm and 12 mm and more preferably selected to be approximately 10 mm.

The face 10 of the spacer which is intended for contact with the front mount 3 is further constructed with a concave surface profile, the concavity allowing greater stability during contact of the spacer with the front mount.

Figure 1:
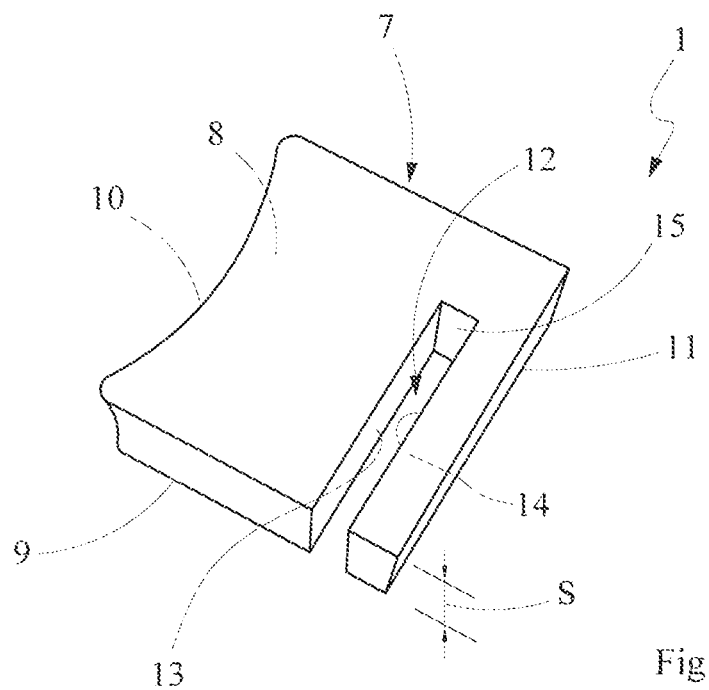
FIGS. 1 and 2 are perspective views of a spacer device produced according to the invention.
Figure 2:
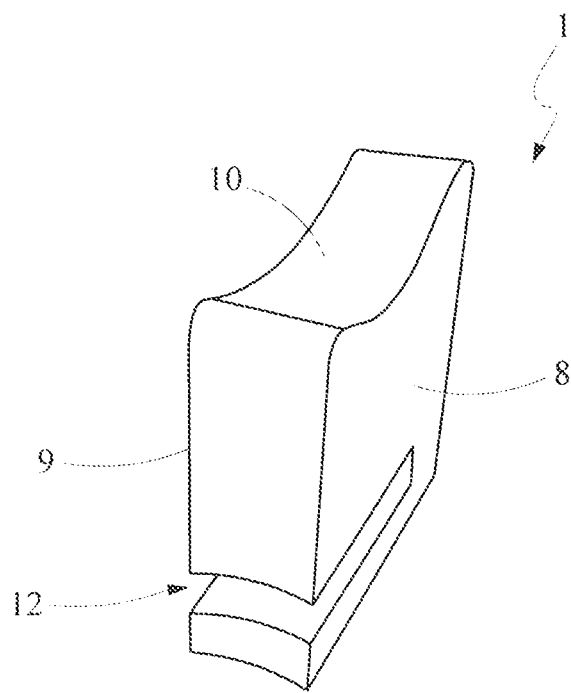
Figure 3:
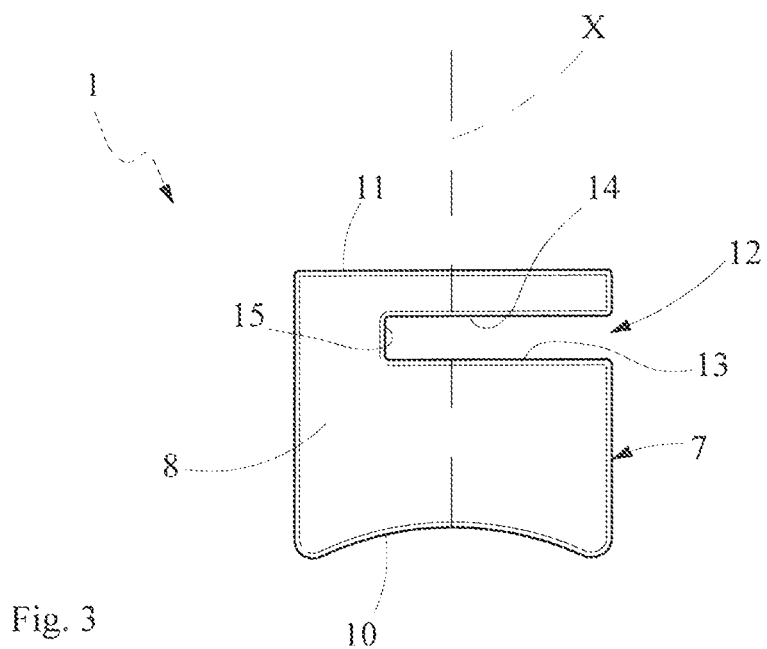
FIG. 3 is a side view of the device of the preceding Figures.

With reference to FIG. 3, the channel 12 is formed in the member 7 at a distance from the face 10 which is intended for contact with the front mount 3 of the frame having dimensions greater than the distance between the channel 12 and the face 11 opposite. The dimensions of these distances are selected to ensure suitable positioning of the arms which are folded in a closing manner on the mount so as to maintain the arms spaced apart from each other and with respect to the mount, but with a smaller overall spatial requirement of the frame.

The spacer device according to the invention is advantageously found to be more secure, reliable and durable with respect to the known solutions.

In the first place, the "U"-shaped profile of the groove is generally found to be more effective while receiving the arm, where applicable also applying a slight blocking action with pressure to the arm itself. In addition, it is more suitable for receiving arms of various thicknesses and dimensions.

The "U"-shaped profile of the channel further preserves the spacer from possible breakage along the internal edge of the channel, in particular in the sections surrounding the base wall of the channel itself. In this regard, the curved connection profiles of the walls with respect to the base of the channel are intended to prevent any breakage of the material around the base surface of the channel, eliminating the points or sections where the efforts would be concentrated in the event of possible predetermined expansions by arms with a particularly great thickness.

Furthermore, as a result of the shaping which is more structured and better conforms to the intended use, the spacer device of the invention is suitable for generating an impression of greater value and care during production, thereby being more highly recommended for the packaging of "high-end" spectacles.

With regard to the materials from which the spacer according to the invention is produced, a first example is illustrated by the expanded polymer materials and by the micro-cellular expanded materials or micro-cellular foams.

Therefore, it is possible to use polymer-based foam EVA (ethylene vinyl acetate polymer) or based on polyethylene, or the like.

Another example is constituted by the so-called expanded rubbers or expanded elastomer materials ("expanded rubber" or "foam rubber"), which is also available in versions formulated and processed in order to be sufficiently soft and flexible, as well as with a low specific weight.

The expanded rubbers are also substantially constituted by "cellular" or "porous" materials, but more often have closed type cells, unlike the expanded polymer materials (microcellular and non-microcellular), non-elastomer materials, often characterized by open cells.

These materials may include (in an exemplary though non-limiting manner) expanded rubbers based on polymer EPDM (Ethylene Propylene Diene Monomer) or expanded nitrile rubbers, for example, the so-called vinyl nitrile foam.

A large portion of the types of material set out above herein are also available as semi-processed products in the form of plates or panels, with various dimensions, densities and thicknesses as well as with various colours. In these cases, the spacer device can therefore be readily produced by means of simple mechanical processing operations carried out on the plates, and in particular by means of the cutting processing operations and the like (for example, with automatic and numerical control machines).

With some of the types of materials set out, it is also possible to produce the spacer by means of a forming process in a mould, from the starting material (liquid or solid resin; expanding agent; other).

In those cases, the device can be removed from the mould with the definitive shape without there being any need to carry out specific processing operations of the mechanical type therein.

Alternatively, at least partially dispensing with a requirement, it is possible to produce the spacer from materials which may be less light but more resistant, such as, for example, non-expanded rubbers or elastomer materials. In those cases, the device may be readily produced by means of injection-moulding or casting processes or by means of a hot compression process.

By using rubbers or elastomer materials, in particular, the possibility of using more "ecologically sustainable" materials is increased, that is to say, with less environmental impact. This is the case, for example, for biodegradable elastomer materials, nowadays being available on the market for plastics materials.

It is also possible, but in a less preferable manner, to use expanded polymer materials of the substantially rigid type, such as, for example, EPS (Expanded PolyStyrene) which, because they are provided with extreme lightness and economy, are substantially non-flexible or completely inflexible and therefore in fact cannot be adapted to various types of frame.

The methods for using the spacer device are as follows.

At the end of the production of the frame and before the packing or packaging thereof, the spacer device 1 is positioned between the central bridge 4 of the front mount 3 and the arm 5 which is closed first. In this manner, the device prevents the relative movement between the arm 5 and the front mount 3, keeping them offset at a predefined distance. It is thereby prevented that there may be any transfer of potential loading by the arm 5 to the front itself, thereby preventing the phenomenon of "creep" in the material of the front.

The channel is intended to receive the first arm 5 in such a manner that this arm in turn acts as a stop for the spacer itself. Being blocked by the arm, the spacer tends to remain in position even in the case of possible accidental movements of the bag or packaging containing the frame, and thereby continues to perform the individual function.

The closure of the second arm 6 brings the arm into contact with the face 11 of the spacer in a position in which the arm 6 remains spaced apart from the arm 5 below.

The spacer being produced from a soft and flexible material, it readily adapts to various models of frame, characterized by various dimensions, shapes, thicknesses of the front mount and the arms, curvatures of the front and the arms, etc., respectively.

The flexibility of the material used further prevents during contact with the device the frame from being subjected to any damage as a result of possible excessive pressures applied by the device itself in reaction to compression forces applied or the packaging case or the packing box, etc.

Another important requirement for the material of the spacer is the lightness. It is advantageous for the spacer to have a particularly low weight in order not to increase substantially the overall weight of the frame and packaging and therefore to maintain at a lower level the costs resulting from the energy consumed for transporting the product.

The invention thereby achieves the objects set out, affording the advantages set out with respect to the known solutions.

The invention claimed is:

1. A spacer device for frames (2) of spectacles configured to maintain a pair of arms (5, 6) of the frame spaced apart from each other and with respect to a front mount (3) of the frame when the arms are folded onto the mount in a closing manner, the device comprising a spacer member (7) which has a thickness (S) which is defined between a pair of opposing surfaces (8, 9), the member extending in a main direction (X), between a pair of opposing faces (10, 11), which are configured for contact with the front mount (3) of the frame and the arm (6) of the pair of arms which is folded last onto the mount (3), respectively, the spacer member (7) comprising a channel (12) which extends in the member transversely to the main direction (X) and which extends through the thickness (S) and which is provided in a position between the faces (10, 11), the channel (12) being delimited by a pair of walls (13, 14) which face each other in a mutually spaced apart relationship and which are connected at an end thereof to a base surface (15) of the channel, the channel (12) configured to be engaged by the arm (5) of the pair which is folded first onto the mount so as to remain spaced apart both from the mount (3) and from the other arm (6) adjacent thereto, wherein the face (10) of the spacer member (7) which is intended for contact with the front (3) of the frame has a concave surface profile.

2. The spacer device according to claim 1, wherein the walls (13, 14) extend in the channel substantially parallel with each other.

3. The spacer device according to claim 1, wherein the walls (13, 14) are connected to the base surface (15) of the channel with a curved surface profile.

4. The spacer device according to claim 1, wherein the channel (12) extends in the spacer member (7) perpendicularly to the main direction (X).

5. The spacer device according to claim 2, wherein the dimension of the distance between the walls (13, 14) of the channel (12) has a value between 2 mm and 7 mm.

6. The spacer device according to claim 1, wherein the thickness (S) of the spacer member (7) has a dimension between 5 mm and 12 mm.

7. The spacer device according to claim 1, wherein the channel (12) is positioned in the member (7) at a distance from the face (10) which is intended for contact with the front mount (3) of the frame having a dimension greater than the distance between the channel (12) and the opposing face (11).

8. The spacer device according to claim 1, wherein the spacer member (7) is constructed from a material selected from expanded polymer materials, micro-cellular expanded materials or micro-cellular foams, expanded elastomer materials.

* * * * *